United States Patent
Moore

(10) Patent No.: US 12,167,486 B2
(45) Date of Patent: Dec. 10, 2024

(54) METHOD AND SYSTEM FOR DYNAMIC LINK AGGREGATION

(71) Applicant: AT&T Intellectual Property I, L.P., Atlanta, GA (US)

(72) Inventor: Adrian Moore, Coppell, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 399 days.

(21) Appl. No.: 17/742,539

(22) Filed: May 12, 2022

(65) Prior Publication Data

US 2023/0371097 A1    Nov. 16, 2023

(51) Int. Cl.
*H04W 76/15*    (2018.01)
*H04L 45/24*    (2022.01)
*H04W 84/12*    (2009.01)

(52) U.S. Cl.
CPC ........... *H04W 76/15* (2018.02); *H04L 45/245* (2013.01); *H04W 84/12* (2013.01)

(58) Field of Classification Search
CPC ...... H04L 45/245; H04W 76/15; H04W 84/12
USPC ........................................................ 370/329
See application file for complete search history.

(56) References Cited

U.S. PATENT DOCUMENTS

| 2015/0156636 A1* | 6/2015 | Tabet | H04L 5/001 370/329 |
| 2017/0187639 A1* | 6/2017 | Hodroj | H04L 47/41 |
| 2023/0156478 A1* | 5/2023 | Liao | H04L 5/0064 370/329 |

* cited by examiner

*Primary Examiner* — Rownak Islam
(74) *Attorney, Agent, or Firm* — Guntin & Gust, PLC; Kenneth S. Kwan

(57) ABSTRACT

Aspects of the subject disclosure may include, for example, determining, by a wireless router or a wireless access point (WAP) associated with a fixed network connection, that a network condition is satisfied, based on the determining that the network condition is satisfied, detecting for available networks operating in licensed spectrum and available networks operating in unlicensed spectrum, responsive to the detecting, identifying a first available network operating in licensed spectrum and a second available network operating in unlicensed spectrum, and aggregating, in one or more link aggregation groups, a first connection established with the first available network and a second connection established with the second available network, thereby augmenting a network capacity of the fixed network connection. Other embodiments are disclosed.

20 Claims, 10 Drawing Sheets

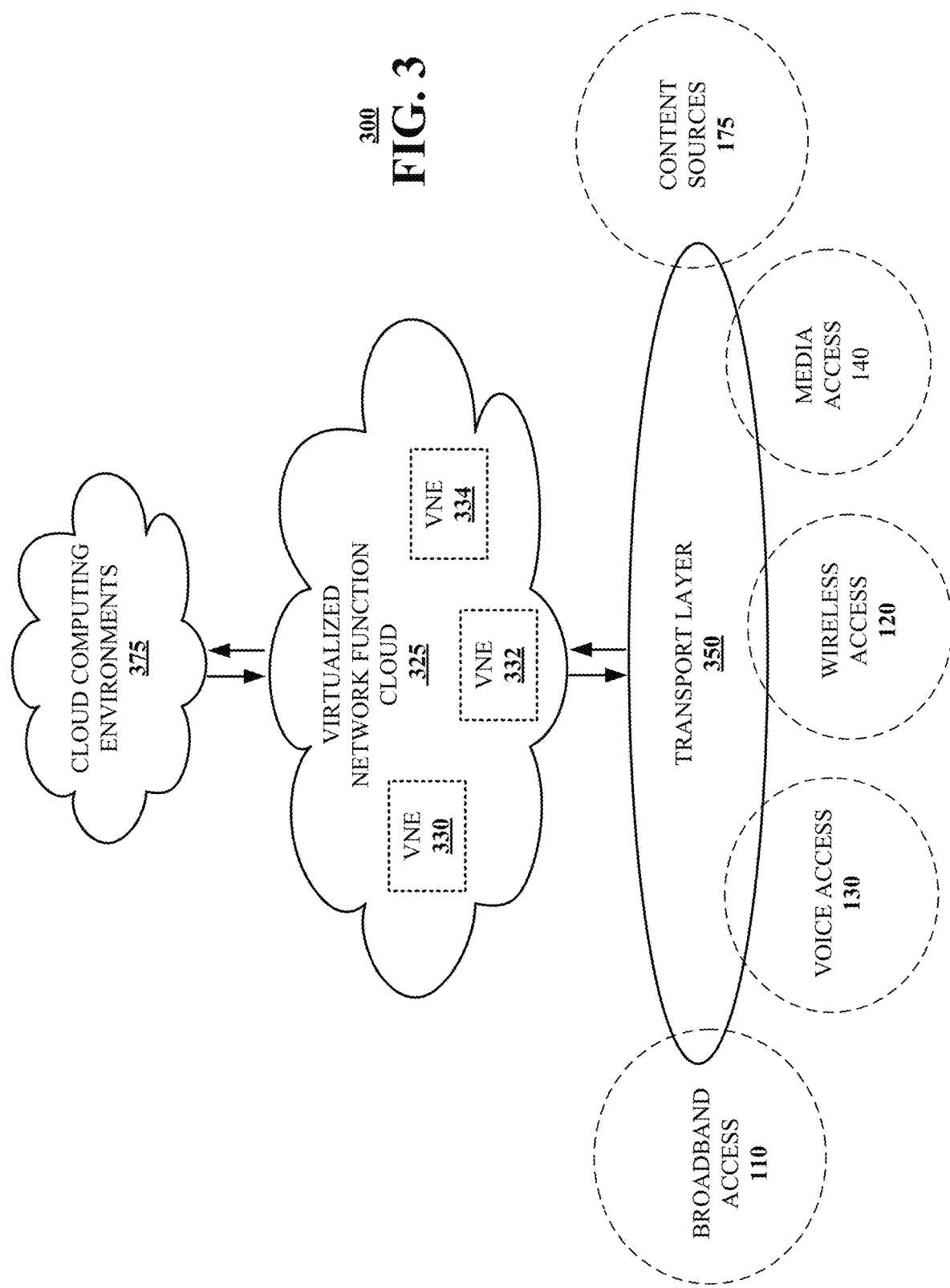

METHOD AND SYSTEM FOR DYNAMIC LINK AGGREGATION

FIELD OF THE DISCLOSURE

The subject disclosure relates to dynamic link aggregation, and more particularly to dynamic assignment (or allocation) of links for a wireless (e.g., Internet-facing) network device, such as a wireless router or a wireless access point (WAP).

BACKGROUND

Advances in the Internet and mobile technology have transformed the way people communicate and interact with one another. Over the years, mobile phones have become an essential part of everyday life. The desire for constant connectivity has even driven many establishments (e.g., retail outlets, sporting venues, and lodging places/business parks) to provide on-premises Wi-Fi access so that their visitors can remain connected at all times.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communications network in accordance with various aspects described herein.

DETAILED DESCRIPTION

Figure 1:
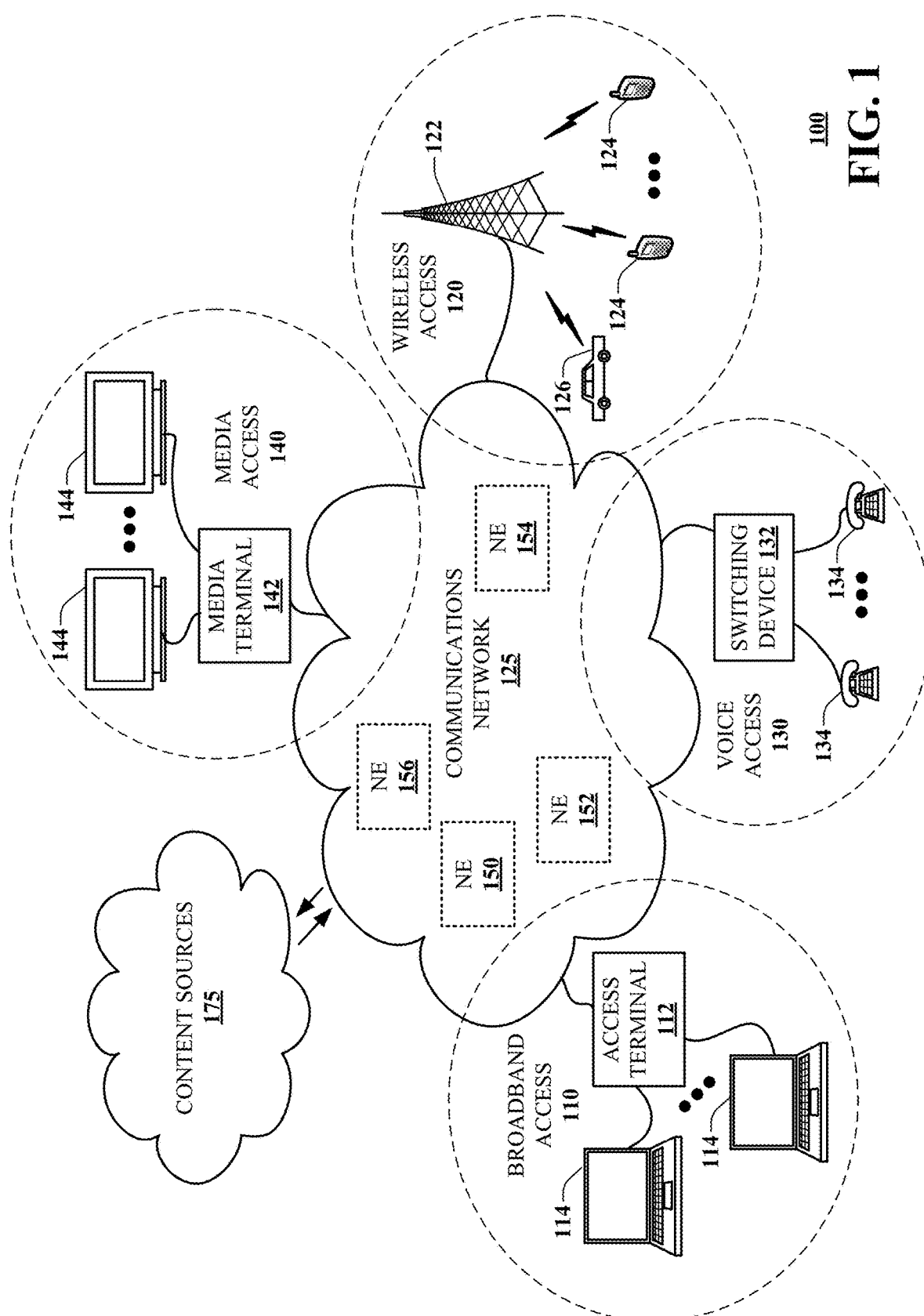
FIG. 1 is a block diagram illustrating an exemplary, non-limiting embodiment of a communications network in accordance with various aspects described herein.

As the demand for network connectivity can fluctuate throughout the day depending on the location, it can be difficult to predict the network capacity (or the "size" of the "pipe") that is needed to accommodate the varying levels of traffic. This is especially so for large venues where waves of visitors may come and go and where many different types of data traffic may be transported over the network infrastructure. For applications that require extremely low latency, a "bandwidth event" can be quite problematic.

A typical solution is to simply oversize the network capacity so that it can accommodate high utilization scenarios. However, this leaves much of the available capacity underutilized for a vast majority of the time, and performance and user experience can also suffer in cases of unexpectedly high demand that exceeds what the oversized pipe can handle. Another solution is to leverage quality-of-service (QOS) to prioritize certain essential traffic that have low latency requirements. However, this introduces performance degradation for non-priority traffic during network congestion. Further, traditional QoS is deployed only in Layer 2 (L2) and Layer 3 (L3) of the Open Systems Interconnection (OSI) model, and thus offers no Layer 1 (L1)-based capacity expansions.

Presently, $3^{rd}$ Generation Partnership Project (3GPP) standards provide user equipment (UEs) with carrier aggregation (CA) and/or long-term evolution (LTE)-wireless local area network (WLAN) aggregation (LWA) technologies that leverage both licensed and unlicensed carrier channels to service bandwidth needs. While these technologies are generally effective at increasing bandwidth for UEs and supporting faster data transfers, the competition for intra-band and inter-band carriers can be fierce in a high utilization or congestion scenario (such as at a large sporting event or conference) where numerous UEs are in close proximity to one another contend for carrier channels. As UEs start consuming other channels to accommodate for bandwidth demands, CA devices can be left with a spectrum deficit. Furthermore, UE power consumption can also increase in the competition for uplink connection aggregations.

The subject disclosure describes, among other things, illustrative embodiments of a dynamic link aggregation (or allocation) system for augmenting network capacity of a wireless network device. The wireless network device may be an Internet-facing, customer premises equipment (CPE), such as a wireless (e.g., Wi-Fi) router or WAP. In exemplary embodiments, the dynamic link aggregation system may operate in Layer 1 of the network stack, and may be configured to augment a fixed (e.g., wired) network connection of the wireless network device by adding additional wireless network connections using available connectivity provided by mobile networks (including from any associated network edge cloud (NEC) mediums) and/or nearby WAPs. In various embodiments, connectivity provided by mobile network(s) may be over licensed spectrum (e.g., frequency bands licensed for use with 4G LTE, 5G, etc.) and connectivity provided by WAPs may be over unlicensed spectrum (e.g., frequency bands used by devices that conform to Institute of Electrical and Electronics Engineers (IEEE) 802.11x standards or the like). In one or more embodiments, the dynamic link aggregation system may deploy, or otherwise utilize, the added connections in one or more link aggregation groups (LAGs) in combination with the wireless network device's fixed network connection to expand the total network capacity (or logical size of the pipe) for the device. Various embodiments also provide for consumption-based tracking to determine costs for using the additional wireless network connections, as described in more detail below.

In exemplary embodiments, the dynamic link aggregation system may monitor network traffic through the wireless network device (e.g., for traffic statistics) to ascertain the bandwidth demand, and determine the additional capacity needed as well as the type(s) and/or quantity of additional network connections that need to be added based on that demand. As described in more detail below, where the demand satisfies a saturation level or threshold (e.g., exceeds a certain capacity of the fixed, physical connection) for a particular period of time, the dynamic link aggregation system may link the wireless network device with added connection(s) in the LAG(s) to enable increased throughput; and where the demand does not satisfy a threshold (e.g., does not exceed a certain capacity of the fixed, physical connection) for a certain period of time, the dynamic link aggregation system may drop or disconnect some or all of the added connections to avoid further incurred costs.

In this way, and as described in more detail below, the dynamic link aggregation system can, according to changes in bandwidth demand, leverage available (e.g., unused) licensed and/or unlicensed spectrum via LTE/5G networks or the like, WLANs, fixed wireless networks, and so on, and combine them in a logical manner to provide the necessary bandwidth for the wireless network device.

Providing on-site operators (whether individuals or owners of establishments, such as hotels, retail spaces, convention spaces, sporting venues, airports, and so on) with the ability to access available network capacity of nearby wireless or cloud-based connectivity and to allocate and de-allocate them in a dynamic manner, as described herein, reduces operational costs that might otherwise need to be expended for an oversized pipe (which can often come with increased facility buildout complexity and capital costs as well as delayed time-to-market if a business is involved). Dynamic link aggregation, as described herein, also reduces or eliminates the need to rely on QoS-based traffic management (which, as indicated above, can negatively impact non-priority traffic in congested environments), simplifies customer premises network setups (by alleviating the need for software defined networking (SDN) logical resources or additional fixed, physical connections or physical equipment at the premises), and allows individuals and business to take advantage of other wireless network connectivity (over licensed and/or unlicensed spectrum) without being limited to what their own service provider might offer. An Internet-facing CPE, as described herein, may be leveraged to optimize traffic at a customer premises and provide improved management and analytics over disperse UEs.

Exemplary embodiments of the dynamic link aggregation system, as described herein, can be employed in emergency or disaster situations to improve network capacity and connectivity in affected regions. For instance, a standalone L2/L3-capable wireless network device equipped with the dynamic link aggregation system may be deployed to provide (or "propagate") Internet connectivity to a small, disaster-inflicted area by aggregating (or joining) available licensed and/or unlicensed spectrum in a LAG configuration. In a larger affected area where an existing network infrastructure might lack commercial power to deliver L3 service to subscribers, various (e.g., subtending) wireless network devices may be employed in strategic locations to aggregate or join available unlicensed spectrum from neighboring or nearby WAPs and propagate the resulting network connectivity to the affected area.

Implementing the dynamic link aggregation system in a centralized, wireless network device, where a fixed (e.g., Ethernet) connection can be dynamically augmented with other network connections operating over licensed and/or unlicensed spectrum to service UEs and other Wi-Fi clients based on fluctuations in bandwidth demand and analytics of available links, also alleviates UE carrier aggregation issues (which frequently occur in large venues where carrier competition and carrier interference at the UE level may be high), and reduces or eliminates a need to implement complex, carrier aggregation-based updates to UE technology. Further, dynamic link aggregation through a wireless network device, as described herein, also provides WLAN (e.g., 802.11x) support, which is lacking in 3GPP carrier aggregation. In various embodiments, dynamic link aggregation may be used in conjunction with carrier aggregation for UEs or other WLAN (e.g., 802.11x) devices that lack LTE/5G (or similar) capabilities. In any case, dynamic link aggregation can provide enhanced network capacity and performance even in extremely congested environments.

Embodiments of the dynamic link aggregation system can also be leveraged to provide network connectivity to areas that restrict communications in particular spectrum, such as 5G-restricted areas in or near airports. As described in more detail below, one or more wireless network devices equipped with the dynamic link aggregation system may be positioned outside of the restricted area, and configured to aggregate group(s) of licensed and/or unlicensed spectrum and utilize WLAN (e.g., 802.11x) frequencies or other unlicensed spectrum to provide network connectivity from these aggregated group(s) to various other wireless network devices located within the restricted area. This can, in the case of airports or other Federal Aviation Administration (FAA) areas, address concerns over the use of restricted frequencies (or frequencies that might be reserved for critical communications) in such areas.

Embodiments of the dynamic link aggregation system also enable network operators to monetize on available network capacity within their mobile networks (e.g., LTE, 5G, etc.), fixed wireless networks, and/or NEC spaces by offering unused bandwidth to retail spaces, sporting venues, small businesses, and so on. Network operators can also expand service offerings to potentially unrealized markets that are consumption-based.

In certain embodiments, dynamic link aggregation may be implemented in an uncrewed aerial vehicle (UAV) having wireless router or WAP functionalities, and may be deployed in different regions to facilitate propagation of aggregated network connections as needed.

One or more aspects of the subject disclosure include a device, comprising a processing system including a processor, and a memory that stores executable instructions that, when executed by the processing system, facilitate performance of operations. The operations can include determining that a network condition is satisfied, wherein the device comprises a wireless router or a wireless access point (WAP) associated with a fixed network connection. Further, the operations can include, based on the determining that the network condition is satisfied, detecting for available networks operating in licensed spectrum and available networks operating in unlicensed spectrum. Further, the operations can include, responsive to the detecting, identifying a first available network operating in licensed spectrum and a second available network operating in unlicensed spectrum. Further, the operations can include aggregating, in one or more link aggregation groups, a first connection established with the first available network and a second connection established with the second available network, thereby augmenting a network capacity of the fixed network connection.

One or more aspects of the subject disclosure include a non-transitory machine-readable medium, comprising executable instructions that, when executed by a processing system of a wireless router or a wireless access point (WAP) including a processor, facilitate performance of operations. The operations can include forming a first link aggregation group that includes a first set of network connections that operate over licensed spectrum. Further, the operations can include forming a second link aggregation group that includes a second set of network connections that operate over unlicensed spectrum. Further, the operations can include performing packet scheduling for first traffic associated with the first set of network connections in the first link aggregation group, second traffic associated with the second set of network connections in the second link aggregation group, and third traffic associated with a fixed network connection of the wireless router or the WAP.

One or more aspects of the subject disclosure include a method. The method can comprise establishing, by a processing system of a first wireless network device, a network connection with a second wireless network device, wherein the first wireless network device is located within an area that restricts use of a particular portion of licensed spectrum, wherein the second wireless network device is located external to the area, and wherein the second wireless network device is configured to dynamically aggregate a plurality of network connections that are established with one or more mobile networks operating in the particular portion of licensed spectrum. Further, the method can include using, by the processing system, the network connection to facilitate network connectivity for one or more client devices located within the area.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, dynamic assignment (or allocation) of links for a wireless (e.g., Internet-facing) network device, such as a wireless (e.g., Wi-Fi) router or a WAP, to augment overall network capacity. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
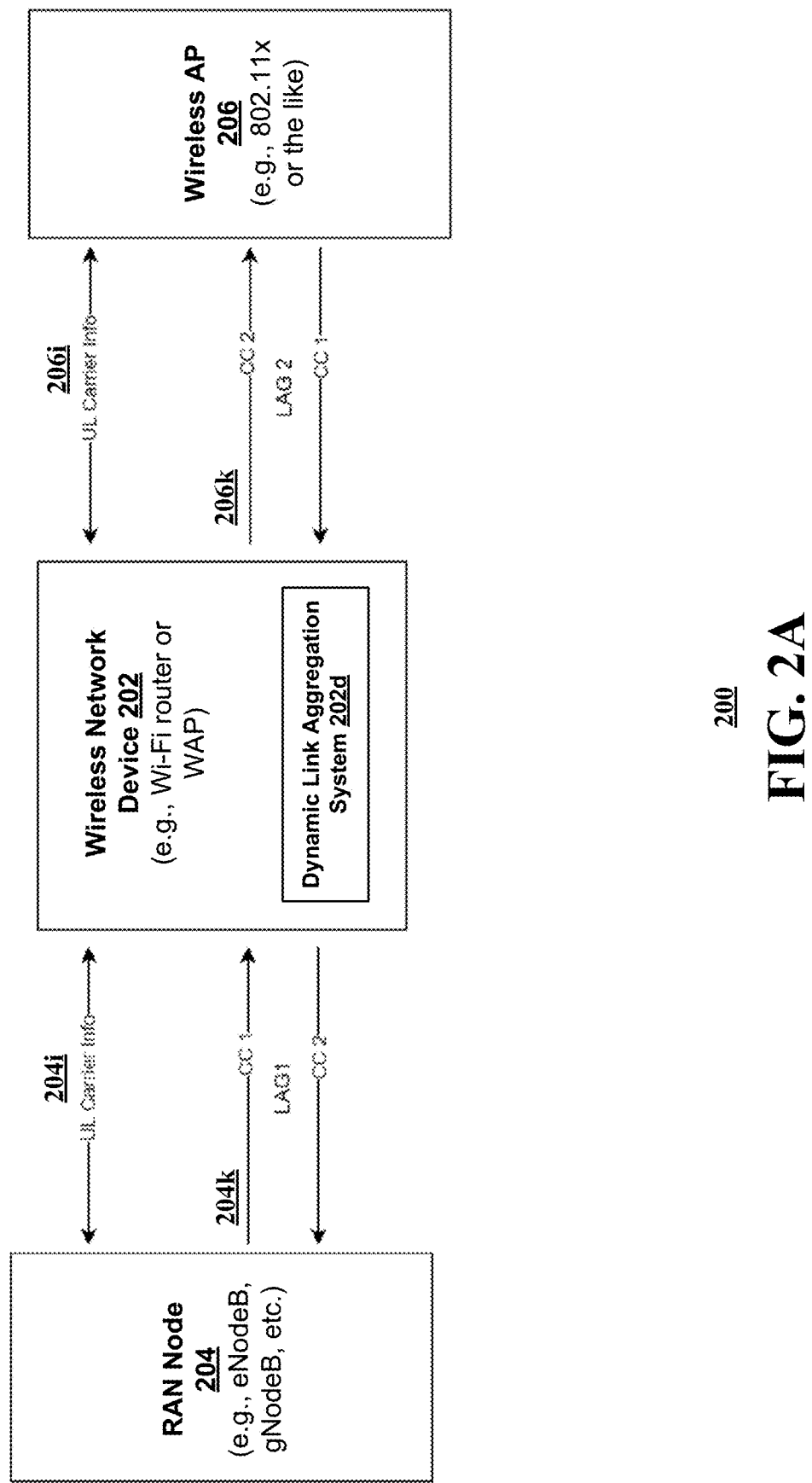
FIG. 2A is a block diagram illustrating an example, non-limiting embodiment of a system functioning within, or overlaid upon, the communications network of FIG. 1 in accordance with various aspects described herein.

FIG. 2A is a block diagram illustrating an example, non-limiting embodiment of a system 200 functioning within, or overlaid upon, the communications network 100 of FIG. 1 in accordance with various aspects described herein.

As shown in FIG. 2A, the system 200 can include a wireless network device 202, a RAN node 204, and a WAP 206. The wireless network device 202 may include one or more devices capable of receiving, storing, generating, processing, and/or transferring traffic (e.g., packets) associated with client devices, such as UEs (not shown). For example, the wireless network device 202 may include a router, a gateway, a switch, a hub, a bridge, an access point, a reverse proxy, a server (e.g., a proxy server, a web server, a host server, a storage server, a server in a data center or cloud computing environment, etc.), a firewall, a security device, an intrusion detection device, a load balancer, a similar type of device, or a combination of some or all of these devices. In exemplary embodiments, the wireless network device 202 may be an Internet-facing CPE, such as a wireless (e.g., Wi-Fi) router or a WAP.

The wireless network device 202 may be communicatively coupled to the Internet over one or more networks via wired connections, wireless connections, or a combination of wired and wireless connections. In exemplary embodiments, the wireless network device 202 may be equipped with one or more "fixed" (e.g., physical) interfaces, such as an Ethernet interface, a fiber optic interface, a coaxial interface, a universal serial bus (USB) interface, a broadband interface, a similar interface, or a combination of some or all of these interfaces, via which the wireless network device 202 may communicatively couple with a network provided by a service provider.

The RAN node 204 may be an access point (e.g., a base station or the like) in a cellular or mobile network, and may be in communication with a mobility core network (not shown). The core network may be in further communication with one or more content delivery networks (CDNs), and may include various network devices and/or systems that provide a variety of functions, such as mobility management, session management, data management, user plane and/or control plane function(s), policy control function(s), and/or the like. The RAN of the cellular or mobile network may include any number/type of network configurations or network nodes and/or various types of heterogeneous cell configurations with various quantities of cells and/or types of cells. In exemplary embodiments, the RAN node 204 may employ one or more radio access technologies (RATs). For example, the RAN node 204 may be an eNodeB (eNB) or the like that employs 4G/LTE technology or a gNodeB (gNB) or the like that employs 5G new radio (NR) technology. The RAN node 204 may include a radio resource control (RRC) entity capable of exchanging network traffic (e.g., protocol data units (PDUs)) with various UEs (not shown). A UE can be equipped with transmitter (Tx) device(s) and/or receiver (Rx) device(s) configured to communicate with, and utilize network resources provided via, the RAN node 204.

The WAP 206 may include one or more devices capable of receiving, storing, generating, processing, and/or transferring traffic (e.g., packets) associated with client devices, such as UEs (not shown). For example, the WAP 206 may include a router, a gateway, a switch, a hub, a bridge, an access point, a reverse proxy, a server (e.g., a proxy server, a web server, a host server, a storage server, a server in a data center or cloud computing environment, etc.), a firewall, a security device, an intrusion detection device, a load balancer, a similar type of device, or a combination of some or all of these devices. In various embodiments, the WAP 206 may be a CPE or a fixed wireless device that has access to the Internet over one or more networks via wired connections, wireless connections, or a combination of wired and wireless connections. For instance, the WAP 206 may (e.g., similar to the wireless network device 202) be equipped with interface(s) for coupling to the Internet.

It is to be appreciated and understood that the types and quantities of the various node(s), device(s), and access point(s) shown in FIG. 2A are merely exemplary. That is, the system 200 may include any number of (e.g., more) wireless network devices 202, RAN nodes 204, and WAPs 206. For instance, the system 200 may include multiple wireless network devices 202, multiple RAN nodes 204, multiple WAPs 206, one or more other devices, and so on.

As depicted in FIG. 2A, the wireless network device 202 may be equipped with a dynamic link aggregation system 202d. In exemplary embodiments, the dynamic link aggregation system 202d may be configured to operate in Layer 1 of the network stack and augment the wireless network device 202's fixed connection with additional wireless network connections using available connectivity provided by mobile networks (including from any associated network edge cloud mediums) and/or nearby WAPs. The wireless network device 202 may be equipped with hardware and/or software that enables the wireless network device 202 to communicate with devices over licensed spectrum (e.g., RAN node 204 via LTE, 5G, etc.) and devices over unlicensed spectrum (e.g., WAP 206 via fixed wireless (e.g., 802.11x or the like), etc.), and aggregate the various network connections in one or more LAGs. Serving as a convergence point for traffic at a particular location, such as a customer premises, the wireless network device 202 may be utilize the dynamic link aggregation system 202d to optimize or improve its overall network capacity to accommodate for changes in bandwidth demand.

In exemplary embodiments, the dynamic link aggregation system 202d may be configured to detect for available licensed and/or unlicensed spectrum to aggregate in one or more LAG configurations. For instance, the dynamic link aggregation system 202d may perform such detection based on receiving and/or analyzing of signals transmitted by the RAN node 204 and/or the WAP 206. In one or more embodiments, the dynamic link aggregation system 202d may obtain or extract identification information from a given signal received from the RAN node 204 or the WAP 206 (e.g., carrier information 204i and/or 206i), and utilize the identification information to identify (e.g., via a lookup operation) a corresponding service provider. In various embodiments, the wireless network device 202 may exchange data with either or both of the RAN node 204 or the WAP 206 to establish respective links—e.g., links 204k and 206k via corresponding component carriers (CC1, CC2) in uplink and downlink directions. The wireless network device 202 may be capable of establishing a link with a network associated with a service provider that is the same as or different from the service provider associated with the wireless network device 202's own fixed connection, which enables flexible augmentation of the overall network capacity for the wireless network device 202.

In various embodiments, the dynamic link aggregation system 202d may obtain, from the RAN node 204 and/or the WAP 206, cost information associated with usage of their respective network resources. Cost information can include, for example, the monetary cost per unit of data transfer over a unit period of time, limit(s) on the total data usage over a certain period of time, and/or the like. In one or more embodiments, the dynamic link aggregation system 202d may derive metrics or identify conditions associated with the RAN node 204 and/or the WAP 206 based on signals or information received from the respective devices. Metrics or conditions may relate to signal quality, interference, noise, noise floor, decibel-milliwatt (dBm), Received Signal Strength Indicator (RSSI), signal-to-noise ratio (SNR), radio frequency (RF) group and neighborhood, transmit power control, dynamic channel assignment, etc.

In exemplary embodiments, the dynamic link aggregation system 202d may aggregate different types of network connections in different LAGs. For instance, as shown in FIG. 2A, the dynamic link aggregation system 202d may aggregate mobile network connections operating in licensed spectrum (such as that associated with the RAN node 204)

in a LAG 1 and other connections operating in unlicensed spectrum (such as that associated with the WAP 206) in a LAG 2, where an aggregate of LAGs 1 and 2 and the wireless network device 202's own fixed connection forms a logical combination of connections for the wireless network device 202. In certain alternate embodiments, the dynamic link aggregation system 202d may aggregate all types of connections in a single LAG.

In exemplary embodiments, the dynamic link aggregation system 202d may perform link aggregation based on bandwidth demand relative to the available network capacity of its (e.g., presently) managed connection(s). In various embodiments, the dynamic link aggregation system 202d may, via one or more algorithm(s), define a first (e.g., rolling) sampling window (e.g., of a certain duration, such as 10 minutes, 15 minutes, etc.) based on a default or user setting, and use the window to identify whether there is a bandwidth deficit, where such a deficit may warrant the addition of one or more additional network connections in a LAG. Identification of a bandwidth deficit may be based on a determined difference between current bandwidth demand and a threshold capacity level (e.g., 85% of the total available network capacity), latency measurement(s) relative to threshold(s), time-out data, and/or other (e.g., real-time) traffic statistics. For instance, the dynamic link aggregation system 202d may seek to augment the wireless network device 202's network capacity with one or more additional network connections (e.g., by discovering and establishing connections with available networks, by establishing connections with previously-discovered networks, etc.) if the current bandwidth demand exceeds the threshold capacity level.

After one or more links have been aggregated in one or more LAGs, the dynamic link aggregation system 202d may, via one or more algorithm(s), define a second (e.g., rolling) sampling window (e.g., of a certain duration, such as 30 minutes, 45 minutes, etc.) based on a default or user setting, and use the window to identify whether there is a bandwidth surplus, where such a surplus may warrant removal of one or more of the network connections in the LAG(s) (and further costs associated with those connection(s) can then be avoided). Identification of a bandwidth surplus may be based on a determined difference between current bandwidth demand and a threshold capacity level (e.g., 50% of the total available network capacity), latency measurement(s) relative to threshold(s), time-out data, and/or other (e.g., real-time) traffic statistics. In various embodiments, the aforementioned first sampling window (for determining whether additional network capacity is needed to address a bandwidth deficit) may be shorter than the second sampling window (for detecting a bandwidth surplus) since it can be more important for the dynamic link aggregation system 202d to act more quickly in situations where bandwidth demand ramps up within a short period of time. In other embodiments, the first sampling window may be equal to or longer than the second sampling window.

In exemplary embodiments, link establishment for aggregation purposes may be facilitated based on a global unique identifier. For instance, the wireless network device 202 may be associated with a unique identifier, such as a media access control (MAC) address, a user account ID (e.g., associated with service provided via the fixed connection), other similar information, or a combination of some or all of this information, which the RAN node 204 (or system(s) associated therewith) or the WAP 206 (or system(s) associated therewith) can utilize for identification, authentication, and/or authorization of the wireless network device 202 as part of (e.g., prior to) establishing a link or network connection with the wireless network device 202. In one or more embodiments, the RAN node 204 (or system(s) associated therewith) or the WAP 206 (or system(s) associated therewith) may utilize the unique identifier to track the wireless network device 202's usage of the respective network connections (e.g., based on throughput, goodput, etc.) for accounting/billing purposes. In various embodiments, identification of the wireless network device 202 by the RAN node 204 (or system(s) associated therewith) or the WAP 206 (or system(s) associated therewith) may be performed any in suitable manner, such as via lookup of central database(s), user management server(s) of other network service providers, and so on. In certain embodiments, different service providers may establish agreements (in advance) to share unique identifiers and/or associated account data for their corresponding subscribers and to set forth billing procedures for any cross-carrier network usage by their corresponding subscribers, which can facilitate later (e.g., real-time) negotiations for link aggregation. In this way, for instance, a first service provider associated with the RAN node 204 may leverage account data associated with the wireless network device 202's unique identifier to directly bill the account for any network usage, or may bill a second service provider associated with the unique identifier/wireless network device 202 for any charges incurred, which the second service provider can then assess to the associated account.

In exemplary embodiments, the dynamic link aggregation system 202d may enable user (or administrator) configuration of the dynamic link aggregation system—e.g., pertaining to criteria for selecting sources/types of network connectivity and/or for general WAN/RAN resource management. Although not shown, the dynamic link aggregation system 202d may enable such user management or configuration via one or more user interfaces (UIs). In exemplary embodiments, the dynamic link aggregation system 202d may be capable of operating in a manual mode or an automatic (self-discovery) mode, and may enable user selection of the operating mode. In the manual mode, the dynamic link aggregation system 202d may enable user selection of the desired sources of networks/connections (e.g., any network/connection associated with any service provider or only networks/connections associated with specific service providers, such as a service provider with whom the user already has an account) and/or desired types of networks/connections (e.g., only networks that operate over licensed spectrum, only networks that operate over unlicensed spectrum, only networks that operate over a certain portion of licensed or unlicensed spectrum, any network that operates over any spectrum, etc.) that the dynamic link aggregation system 202d is permitted to add to LAG(s). Additionally, or alternatively, the dynamic link aggregation system 202d may enable user customization/selection of one or more bandwidth-related thresholds for triggering link aggregation/de-aggregation, one or more of the above-described sampling windows for triggering link aggregation/de-aggregation, and/or one or more metrics or conditions (e.g., relating to signal quality, interference, noise, noise floor, decibel-milliwatt (dBm), Received Signal Strength Indicator (RSSI), signal-to-noise ratio (SNR), radio frequency (RF) group and neighborhood, transmit power control, dynamic channel assignment, monetary cost for data usage, etc.) and associated threshold(s) that need to be satisfied in order for a given network/connection to be considered for link aggregation/de-aggregation. In various embodiments, the dynamic link aggregation system 202d may provide (e.g., via the UI(s)) real-time/historical network and usage statistics associated with the wireless network device 202 and/or detected available networks (e.g., available network capacity and/or latency of a given network X, typical time periods during which bandwidth demand increases by Y %, and so on) to aid the user with some or all of the aforementioned selections. In this way, a user may perform local/dynamic resource management to customize the operation of the dynamic link aggregation system 202d for optimized or improved performance based on useful statistics, as needed—i.e., so that, for instance, only network connections from certain eNBs/gNBs or WAPs are aggregated in LAG(s) during certain time periods, only a certain neighbor's WAP is ever aggregated in LAG(s), only network connections that have sufficiently low latencies and/or that are associated with low costs are aggregated in LAG(s), etc.

In the automatic (self-discovery) mode, the dynamic link aggregation system 202d may detect available networks/connections and select, from among the available networks/connections, specific networks/connections to aggregate in LAG(s) with minimal to no user intervention. Here, the dynamic link aggregation system 202d may rank available networks/connections based on one or more factors, and selectively add networks/connections according to the ranking. The factors may relate to network/connection type (e.g., fixed, wireless, 4G, 5G, network cloud, etc.), bandwidth demand relative to current available capacity, historical usage information, goodput measurements (e.g., at the time of link establishment with a network), latency measurements (e.g., at the time of link establishment with a network), network/connection usage cost, and/or some or all of the user settings or constraints described above with respect to the manual mode.

In certain embodiments, the dynamic link aggregation system 202d may provide the capability for reserved carrier aggregation. Here, the dynamic link aggregation system 202d may offer the user with more granular control of how and whether mobile carrier network connections are aggregated in a LAG. In one or more embodiments, the dynamic link aggregation system 202d may enable a user to prioritize certain traffic type(s) (e.g., video, voice, or point-of-sale (POS) application traffic) or network destination(s) (e.g., PoS servers) for particular mobile carrier(s) (e.g., a mobile network of a particular service provider) such that aggregated network connections associated with those particular mobile carrier(s) are dedicated for those traffic types/network destination(s). In this way, a user or administrator can ensure that non-essential traffic (e.g., large file downloading, streaming, etc.) will not consume crucial bandwidth of a given network that is needed for certain critical application traffic.

In exemplary embodiments, the dynamic link aggregation system 202d may provide network-related data to a global network control server (e.g., associated with the service provider of the fixed connection of the wireless network device 202), which can function as a centralized radio network controller and/or network manager for the wireless network device 202 and other like wireless network devices across an RF Group or RF neighborhood. In various embodiments, the global network control server may obtain enhanced data analytics based on network-related data received from the various wireless network devices, which can reveal valuable information regarding network usage in various geographic regions and enable generation of recommendations at the global/macro-level. For instance, indications (in various network-related data received by a global network control server of a first service provider) that wireless network devices associated with the first service provider are constantly establishing links with a network of a competing second service provider, can inform the first service provider on whether to install new equipment or upgrade its existing infrastructure to address the increased network resource demand of its subscribers in the area.

In certain embodiments, the dynamic link aggregation system 202d may be configured to detect for available licensed and/or unlicensed spectrum to aggregate and/or otherwise perform link aggregation in a predictive manner. For instance, the dynamic link aggregation system 202d may predict whether aggregation will be needed in an upcoming time period (e.g., in the next ten minutes, fifteen minutes, etc. for a duration of an hour, two hours, etc.) based on historical traffic data, current traffic/service type, timing of prior user requests, and/or the like, and may detect for available licensed and/or unlicensed spectrum to aggregate and/or otherwise perform link aggregation based on the prediction.

Figure 2B:
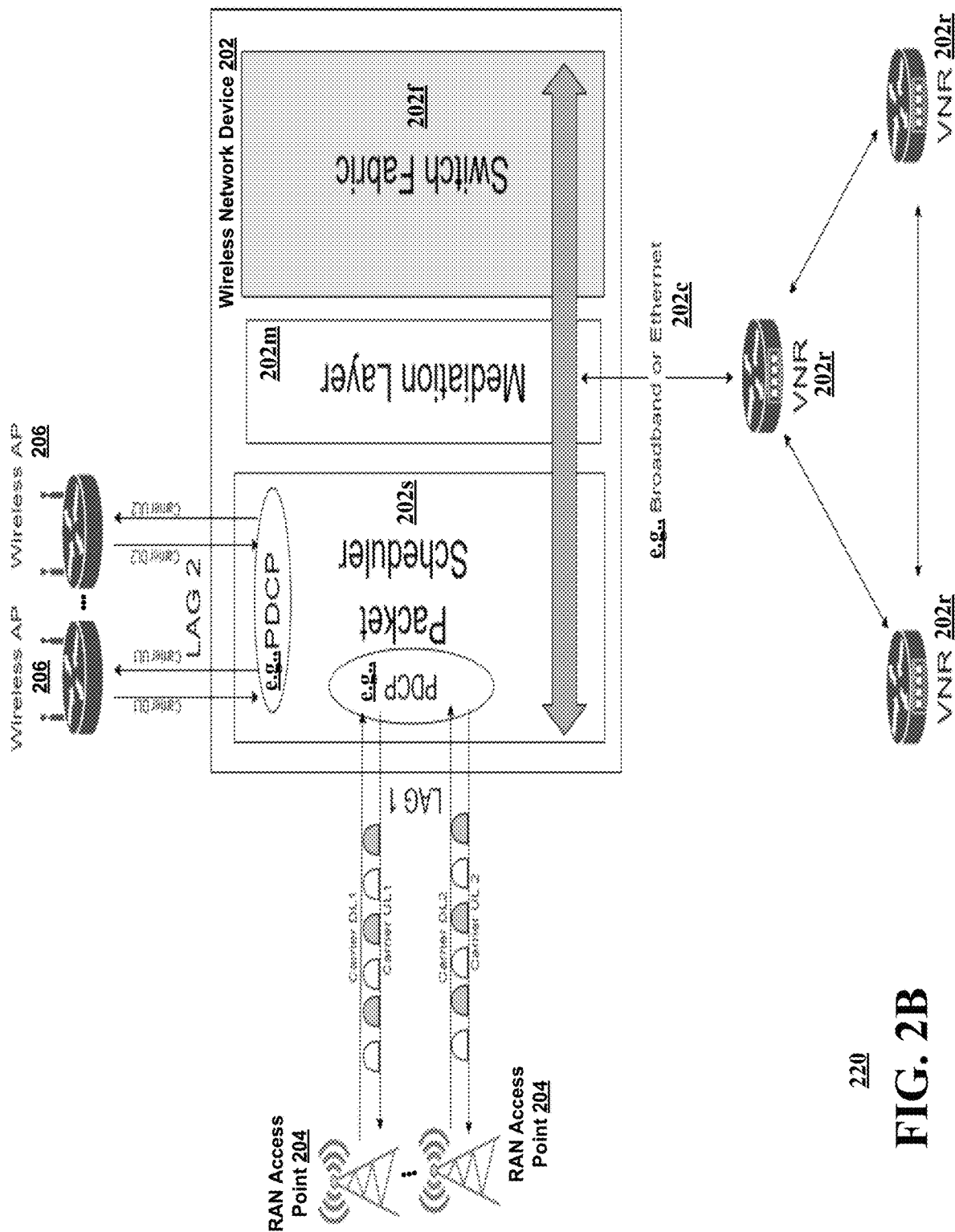
FIG. 2B is a block diagram illustrating an example, non-limiting embodiment of a system functioning within, or overlaid upon, the communications network of FIG. 1 and/or the system of FIG. 2A in accordance with various aspects described herein.

FIG. 2B is a block diagram illustrating an example, non-limiting embodiment of a system 220 functioning within, or overlaid upon, the communications network 100 of FIG. 1 and/or the system 200 of FIG. 2A in accordance with various aspects described herein. In various embodiments, the system 220 may be similar to the system 200 of FIG. 2A. As shown in FIG. 2B, the system 220 may include the wireless network device 202, multiple RAN access points 204, and multiple WAPs 206, and may be coupled to the Internet via a fixed connection 202c associated with network resources 202r. Here, the RAN access points 204 may correspond to different mobile networks of different service providers or to network(s) of the same service provider, and the WAPs 206 may correspond to different entities (e.g., different service providers, different individual users, different customer premises, etc.) or to the same entity. The wireless network device 202 may thus be capable of aggregating links associated with a variety of service providers and entities, and thereby provide flexible (e.g., cross-carrier) augmentation of the fixed connection 202c.

As depicted in FIG. 2B, the wireless network device 202 may include a switch fabric 202f, a mediation layer 202m, and a packet scheduler 202s. Some or all of the functionality of the dynamic link aggregation system 202d may be implemented in one or more of the switch fabric 202f, the mediation layer 202m, and the packet scheduler 202s. In various embodiments, the mediation layer 202m may include input and/or output components that provide points of attachment for physical links, and a control component configured to receive packets, send packets, and/or store packets. A packet may include a payload and header data (e.g., ingress/egress port and/or address identifier(s), including, for example, Layer 2 header data, such as Ethernet header data (e.g., media access control (MAC) address information, etc.) and/or Layer 3 header data, such as Internet Protocol (IP) header data (e.g., IP address information, time to live (TTL) information, etc.)).

In exemplary embodiments, the mediation layer 202m may function as a master scheduler for the wireless network device 202 that schedules packets for transmission on output physical links. The mediation layer 202m may support data link layer encapsulation or decapsulation and/or a variety of higher-level protocols, and may include one or more packet processing components (e.g., in the form of integrated circuits and/or software), such as one or more packet forwarding components, processors, memories, and/or output queues.

The switch fabric 202f may interconnect some or all of the components of the mediation layer 202m and the packet scheduler 202s. In various embodiments, the switch fabric 202f may be implemented via one or more crossbars and/or busses with shared memories. The shared memories may act as temporary buffers to store packets from input components before the packets are eventually scheduled for delivery to output components.

The packet scheduler 202s may be communicatively coupled to the mediation layer 202m, and may include interfaces that are configured to communicate with the RAN nodes 204 and/or the WAPs 206. For instance, as shown, the packet scheduler 202s may be configured to communicate with the RAN nodes 204 and/or the WAPs 206 according to the packet data convergence protocol (PDCP). Additional or alternative protocols may also be employed. The interfaces may be implemented such that the wireless network device 202 treats or "sees" them as physical interfaces, which can enable logical association or aggregation of the connections over these interfaces. The packet scheduler 202s may thus facilitate handshaking over these interfaces to join or combine connections associated with different protocols into one or more LAG configurations.

In various embodiments, PDCP may be employed to schedule or reorder packets for the different types of licensed spectrum-based links (e.g., 5G, LTE, etc.) and unlicensed spectrum-based links (e.g., WLAN). In one or more embodiments, the packet scheduler 202s may include different sub-schedulers for different link types. For instance, the packet scheduler 202s may include a sub-scheduler for licensed spectrum-based links (e.g., LAG 1) and a different sub-scheduler for unlicensed spectrum-based links (e.g., LAG 2), which can simplify the implementation from a scheduling perspective. Alternatively, the packet scheduler 202s may include a single scheduling function that performs scheduling-related tasks for all types of links. In any case, the packet scheduler 202s may coordinate with, or operate under the control of, the mediation layer 202m to facilitate overall packet scheduling.

In exemplary embodiments, the mediation layer 202m may be configured to utilize or combine connections that conform to a variety of communications standards, including mobile network technology standards (e.g., LTE/5G or other radio access technologies), WLAN standards (e.g., IEEE 802.11x or other similar standards), fixed connection standards (e.g., IEEE 802.3 or other similar standards), and so on. By leveraging PDCP, the mediation layer 202m may perform master packet scheduling/reordering for (or between) the different standards associated with the RAN nodes 204, the WAPs 206, and the fixed connection 202c, and "converge" this to the switch fabric 202f. In other words, the mediation layer 202m may operate in Layer 1 and "holistically" schedule packets for the fixed connection 202c and for LAGs 1, 2 to operate within the framework of the switch fabric 202f. In this way, the wireless network device 202 may aggregate links associated with a variety of devices (e.g., eNBs/gNBs, upstream L2/L3 virtual network functions (VNFs), and other devices operating in unlicensed spectrum, such as frequencies utilized by 802.11x) and perform scheduling and flow control to optimize or improve the LAG in an efficient manner.

Although not shown in FIGS. 2A and 2B, in some alternate embodiments, one or more servers (e.g., implemented in a network associated with the fixed connection (e.g., 202c) of the wireless network device 202, such as in the form of a network edge system or the like) may be configured to perform some or all of the abovementioned dynamic link aggregation functions as needed, with or without involvement of the wireless network device 202.

It is to be understood and appreciated that the quantity and arrangement of systems, nodes, devices, access points, resources, schedulers, layers, and fabrics, shown in FIGS. 2A and 2B are provided as an example. In practice, there may be additional systems, nodes, devices, access points, resources, schedulers, layers, and/or fabrics, fewer systems, nodes, devices, access points, resources, schedulers, layers, and/or fabrics, different systems, nodes, devices, access points, resources, schedulers, layers, and/or fabrics, or differently arranged systems, nodes, devices, access points, resources, schedulers, layers, and/or fabrics shown in FIGS. 2A and 2B. For example, the systems 200 and/or 220 can include more or fewer systems, nodes, devices, access points, resources, schedulers, layers, and/or fabrics, etc. In practice, therefore, there can be hundreds, thousands, millions, billions, etc. of such systems, nodes, devices, access points, resources, schedulers, layers, and/or fabrics. In this way, each of the example systems can coordinate, or operate in conjunction with, a set of systems, nodes, devices, access points, resources, schedulers, layers, and/or fabrics and/or operate on data sets that cannot be managed manually or objectively by a human actor. Furthermore, two or more systems, nodes, devices, access points, resources, schedulers, layers, or fabrics shown in FIGS. 2A and 2B may be implemented within a single system, node, device, access point, resource, scheduler, layer, or fabric, or a system, node, device, access point, resource, scheduler, layer, or fabric shown in any of FIGS. 2A and 2B may be implemented as multiple systems, nodes, devices, access points, resources, schedulers, layers, or fabrics. Additionally, or alternatively, a set of systems, nodes, devices, access points, resources, schedulers, layers, or fabrics of the example systems may perform one or more functions described as being performed by another set of systems, nodes, devices, access points, resources, schedulers, layers, or fabrics of the example systems.

It is also to be understood and appreciated that, although FIGS. 2A and 2B are described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Figure 2C:
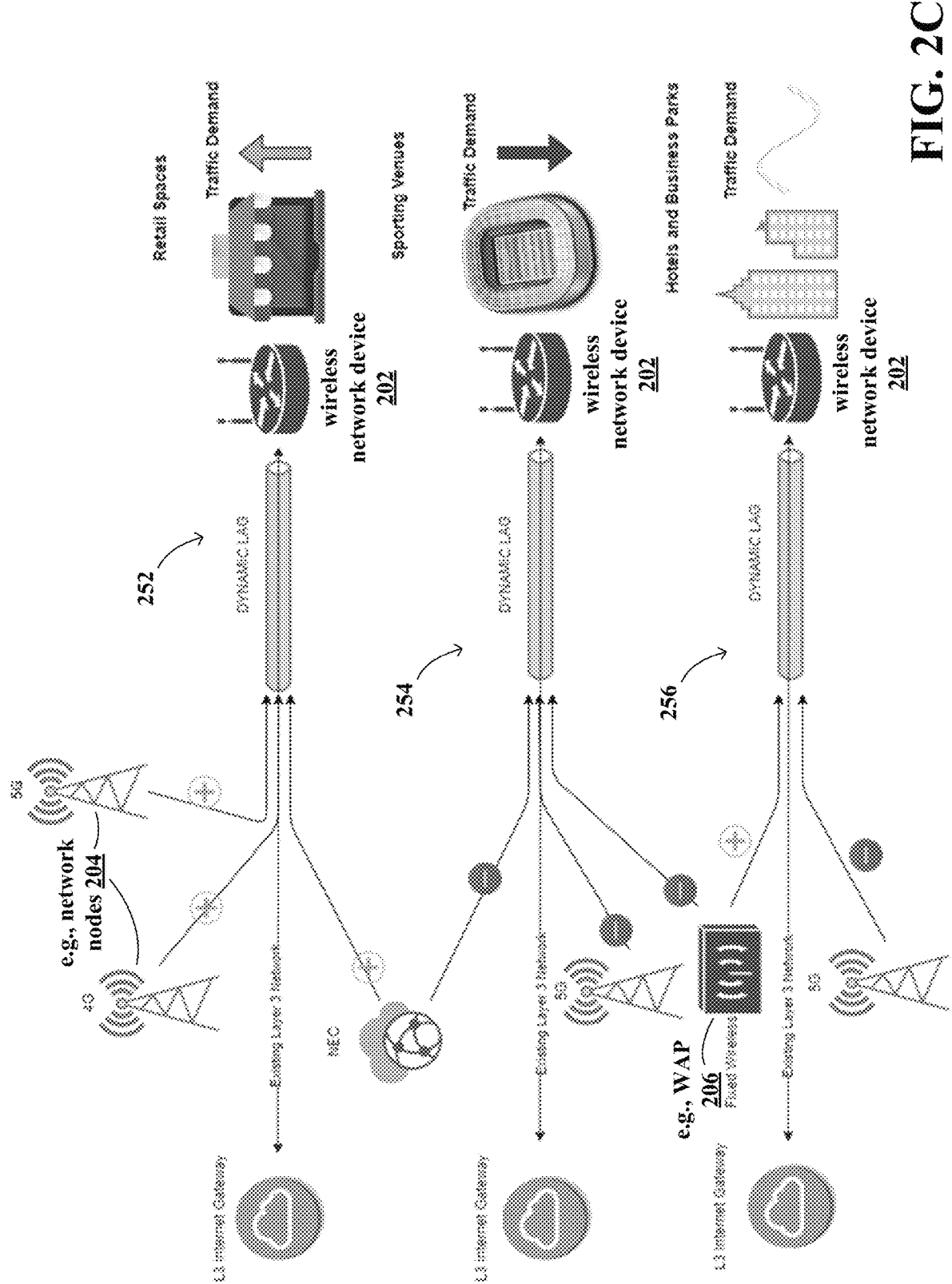
FIG. 2C illustrates various example scenarios in which wireless network device(s) equipped with dynamic link aggregation functionality may perform aggregation/de-aggregation of network connections in accordance with various aspects described herein.

FIG. 2C illustrates various example scenarios in which wireless network device(s) equipped with dynamic link aggregation functionality may perform aggregation/de-aggregation of network connections in accordance with various aspects described herein. As shown in FIG. 2C, embodiments of the wireless network device 202 may be employed in different contexts (e.g., in a customer/retail premises, at a sporting venue, at a lodging area/business park, and so on) to perform dynamic link aggregation/de-aggregation for a variety of types of network connections, including those for mobile networks, NECs, fixed wireless, SDN fixed connections, and other Layer 3 systems.

As depicted in example 252, the wireless network device 202 may aggregate network connections from network nodes 204, an L3 Internet gateway, and a NEC in one or more LAG configurations. For instance, the wireless network device 202 may, based upon detecting an increase in traffic or bandwidth demand (e.g., above a threshold level) and/or identifying a bandwidth deficit in its fixed network connection (e.g., bandwidth usage above a threshold for a certain period of time, such as, for example, 85% of the total capacity of the fixed network connection for longer than 15 minutes), employ dynamic link aggregation by detecting for available networks and selecting one or more of these available networks to join in one or more LAGs (e.g., similar to that described above with respect to one of more of FIGS. 2A and 2B). In various embodiments, the wireless network device 202 may attempt to aggregate links until a total target capacity is obtained (such as, for example, until bandwidth usage is equal to or less than 50% of the total aggregated capacity). Consumption-based monitoring and billing may also be performed for usage of the links in the aggregation.

Example 254 illustrates a scenario where the wireless network device 202 may disconnect or drop one or more network connections in one or more LAGs. Here, for instance, the wireless network device 202 may, based upon determining that bandwidth usage remains below a threshold for a certain period of time (e.g., is less than 40% of the total aggregate capacity of the LAG(s) for more than 30 minutes, and thus there is a bandwidth surplus), disconnect or drop some or all of the connections in the LAG(s) until a target bandwidth surplus value is obtained—e.g., until the bandwidth usage is equal to or under about 50% of the total aggregated capacity.

Example 256 illustrates a scenario where the wireless network device 202 (e.g., continuously) performs dynamic aggregation/de-aggregation of links depending on bandwidth deficit or surplus, similar to that in examples 252 and 254. In various embodiments, the wireless network device 202 may select connections to remove or drop based on cost. Cost may relate to monetary cost (e.g., cost per unit of data usage over time) and/or performance cost (e.g., based on latency, noise, etc.). For instance, the wireless network device 202 may compare the monetary cost and/or performance cost of each of the connections in an aggregation, and selectively drop one or more of the connections that are associated with the highest monetary cost and/or performance cost.

Figure 2D:
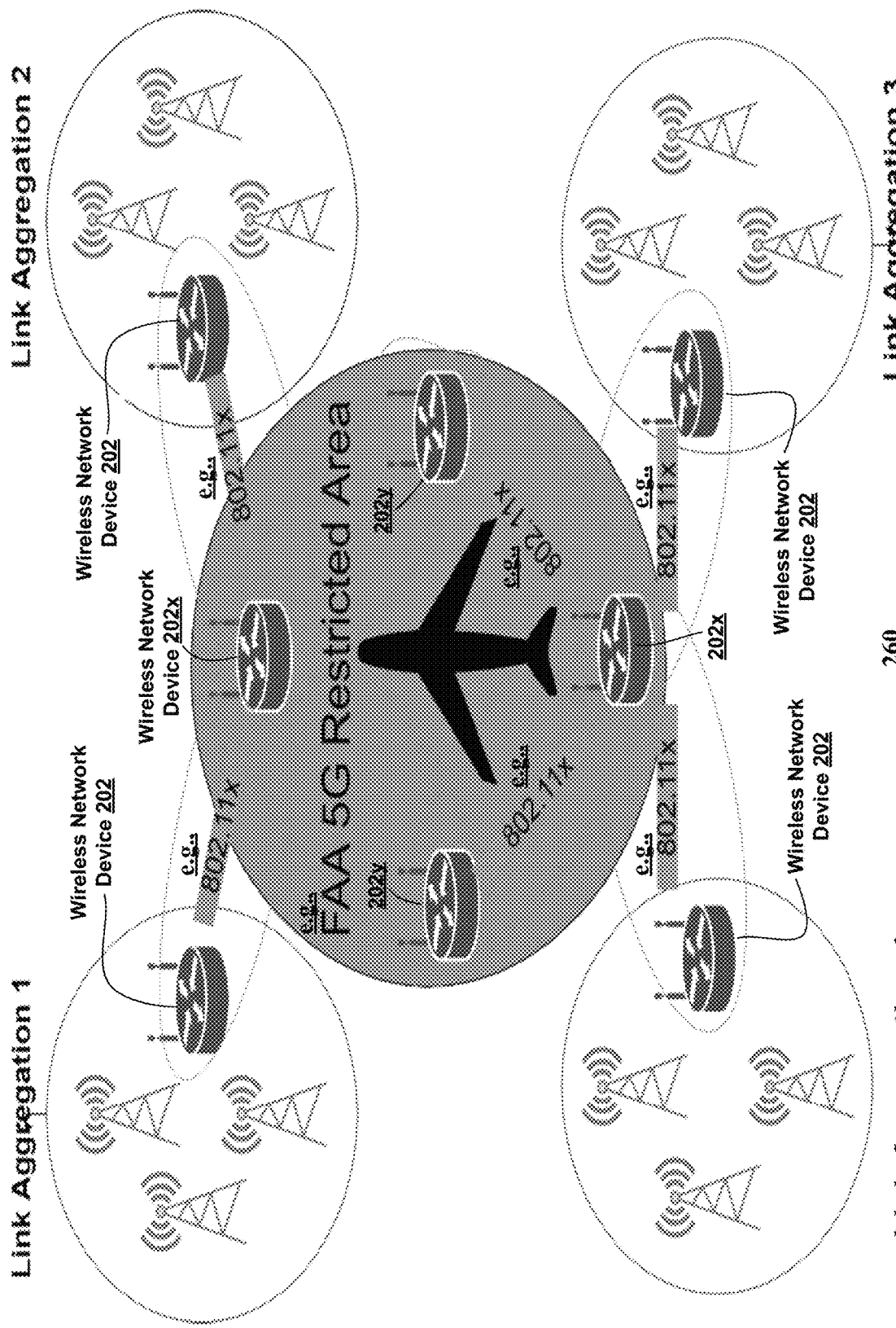
FIG. 2D illustrates an example implementation in which multiple wireless network devices equipped with dynamic link aggregation functionality provide network connectivity to a restricted area in accordance with various aspects described herein.

FIG. 2D illustrates an example implementation 260 in which multiple wireless network devices equipped with dynamic link aggregation functionality provide network connectivity to a restricted area in accordance with various aspects described herein. As depicted in FIG. 2D, the example restricted area may be an FAA 5G-restricted area, although the configuration may be employed in other types of restricted areas. Here, one or more wireless network devices 202 equipped with dynamic link aggregation functionality may be positioned outside of the restricted area, and configured to aggregate group(s) of licensed and/or unlicensed spectrum—e.g., link aggregation groups 1-4. As shown, the various wireless network devices 202 may utilize WLAN (e.g., 802.11x) frequencies or other unlicensed spectrum to provide network connectivity from these aggregated group(s) to various other wireless network devices 202x located within the restricted area, and these wireless network devices 202x may further "propagate" the connectivity to yet other wireless network devices 202y in the restricted area. This advantageously addresses any concerns that might exist over the use of restricted frequencies (or frequencies that might be reserved for critical communications) in the restricted area.

Figure 2E:
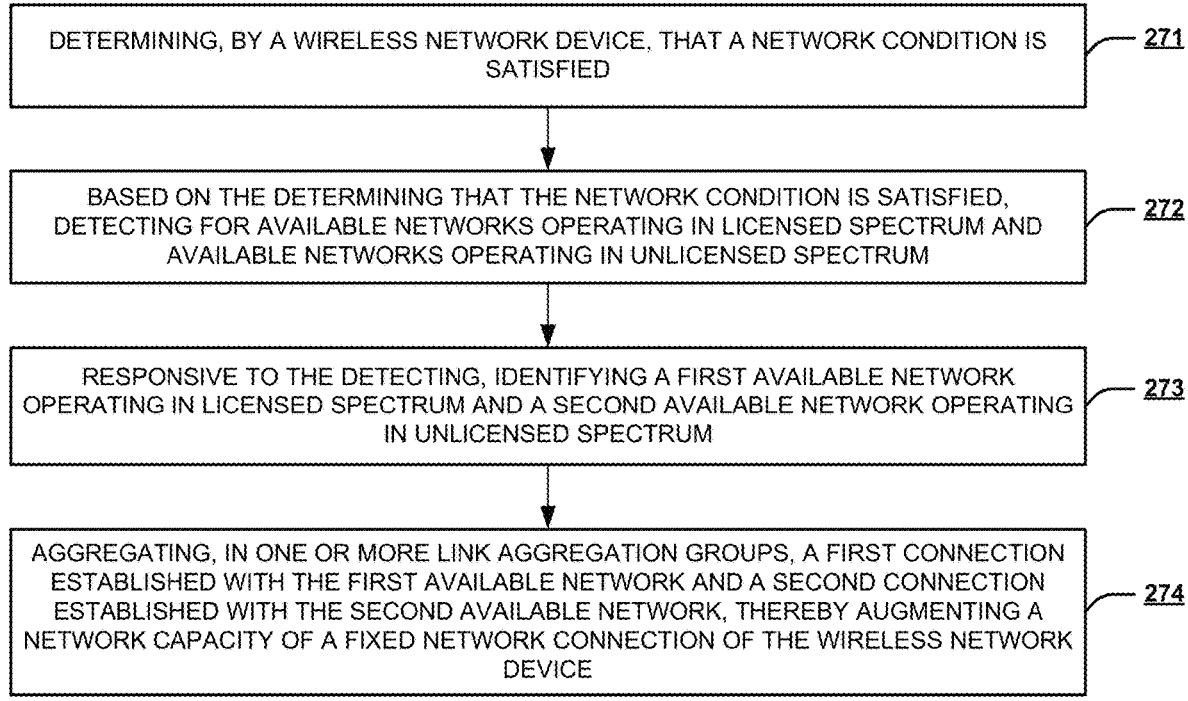
FIG. 2E depicts an illustrative embodiment of a method in accordance with various aspects described herein.

FIG. 2E depicts an illustrative embodiment of a method 270 in accordance with various aspects described herein. In some embodiments, one or more process blocks of FIG. 2E can be performed by a wireless network device, such as the wireless network device 202.

At 271, the method can include determining, by a wireless network device, that a network condition is satisfied. For example, the wireless network device 202 can, similar to that described elsewhere herein, perform one or more operations that include determining that a network condition is satisfied.

At 272, the method can include, based on the determining that the network condition is satisfied, detecting for available networks operating in licensed spectrum and available networks operating in unlicensed spectrum. For example, the wireless network device 202 can, similar to that described elsewhere herein, perform one or more operations that include, based on the determining that the network condition is satisfied, detecting for available networks operating in licensed spectrum and available networks operating in unlicensed spectrum.

At 273, the method can include, responsive to the detecting, identifying a first available network operating in licensed spectrum and a second available network operating in unlicensed spectrum. For example, the wireless network device 202 can, similar to that described elsewhere herein, perform one or more operations that include, responsive to the detecting, identifying a first available network operating in licensed spectrum and a second available network operating in unlicensed spectrum.

At 274, the method can include aggregating, in one or more link aggregation groups, a first connection established with the first available network and a second connection established with the second available network, thereby augmenting a network capacity of a fixed network connection of the wireless network device. For example, the wireless network device 202 can, similar to that described elsewhere herein, perform one or more operations that include aggregating, in one or more link aggregation groups, a first connection established with the first available network and a second connection established with the second available network, thereby augmenting a network capacity of a fixed network connection of the wireless network device 202.

In some implementations of these embodiments, the determining that the network condition is satisfied comprises identifying that there is a bandwidth deficit associated with the fixed network connection.

In some implementations of these embodiments, the first available network comprises a mobile network, wherein the detecting for available networks operating in licensed spectrum comprises receiving one or more signals from one or more radio access network (RAN) nodes.

In some implementations of these embodiments, the second available network comprises a wireless local area network (WLAN) or a fixed wireless network, wherein the detecting for available networks operating in unlicensed spectrum comprises receiving one or more signals from one or more WAPs.

In some implementations of these embodiments, the fixed network connection comprises an Ethernet connection or a broadband connection.

In some implementations of these embodiments, the one or more link aggregation groups comprise a first link aggregation group that includes the first connection and a second link aggregation group that includes the second connection.

In some implementations of these embodiments, the determining that the network condition is satisfied involves use of a sampling window.

In some implementations of these embodiments, a first network system associated with the first available network and a second network system associated with the second available network utilize a global unique identifier associated with the wireless network device to assess charges for usage of the first available network and the second available network.

In some implementations of these embodiments, the method may further include performing a first determination that a first performance associated with the first connection satisfies one or more performance criteria and performing a second determination that a second performance associated with the second connection satisfies the one or more performance criteria, wherein the aggregating is effected based on the first determination and the second determination. In some implementations of these embodiments, the one or more performance criteria relate to network latency, network speed, noise, interference, signal quality, signal strength, transmit power, usage cost, or a combination thereof.

In some implementations of these embodiments, the method may further include, after the aggregating, determining that a second network condition is satisfied and removing the first connection, the second connection, or both from the one or more link aggregation groups based on the determining that the second network condition is satisfied. In some implementations of these embodiments, the determining that the second network condition is satisfied comprises identifying a bandwidth surplus in total network capacity of the one or more link aggregation groups.

In some implementations of these embodiments, the method may further include providing a user interface (UI) that enables a user or an administrator to select operational settings relating to dynamic link aggregation.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, the subsystems and functions of system 200, the subsystems and functions of system 220, and method 270 presented in FIGS. 1, 2A, and 2B. For example, virtualized communications network 300 can facilitate, in whole or in part, dynamic assignment (or allocation) of links for a wireless (e.g., Internet-facing) network device, such as a wireless (e.g., Wi-Fi) router or a WAP, to augment overall network capacity.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
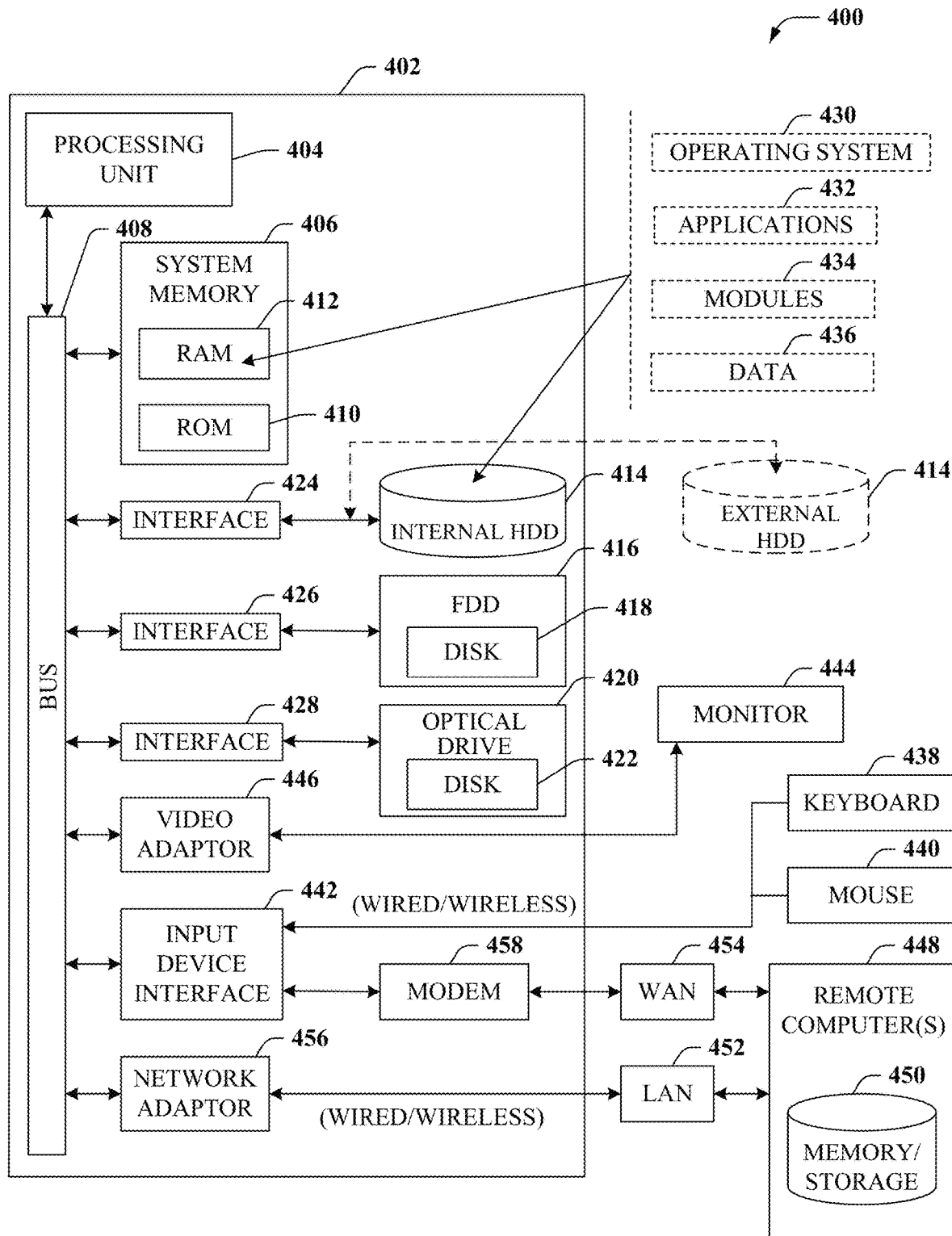
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, dynamic assignment (or allocation) of links for a wireless (e.g., Internet-facing) network device, such as a wireless (e.g., Wi-Fi) router or a WAP, to augment overall network capacity.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
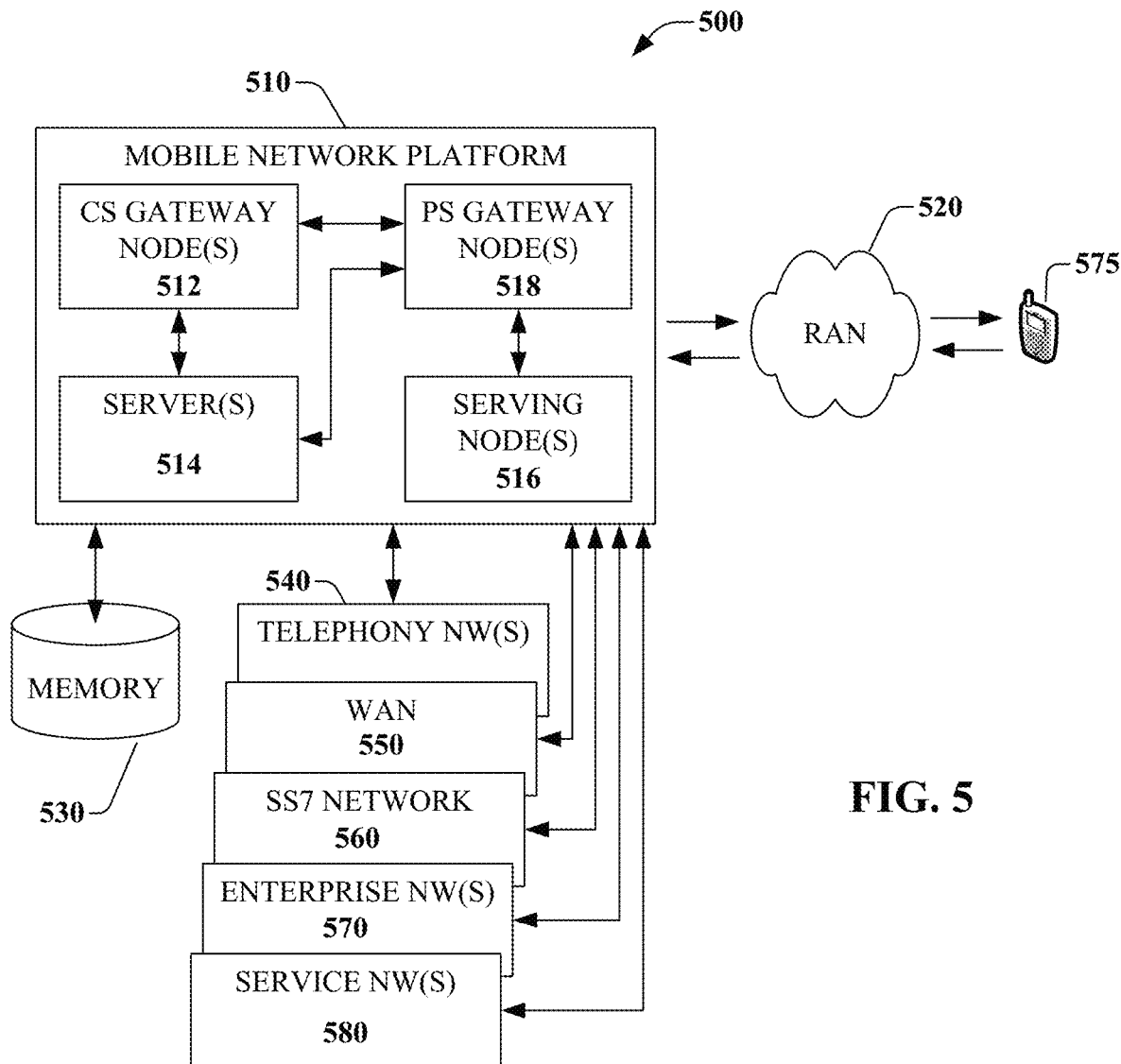
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, dynamic assignment (or allocation) of links for a wireless (e.g., Internet-facing) network device, such as a wireless (e.g., Wi-Fi) router or a WAP, to augment overall network capacity. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
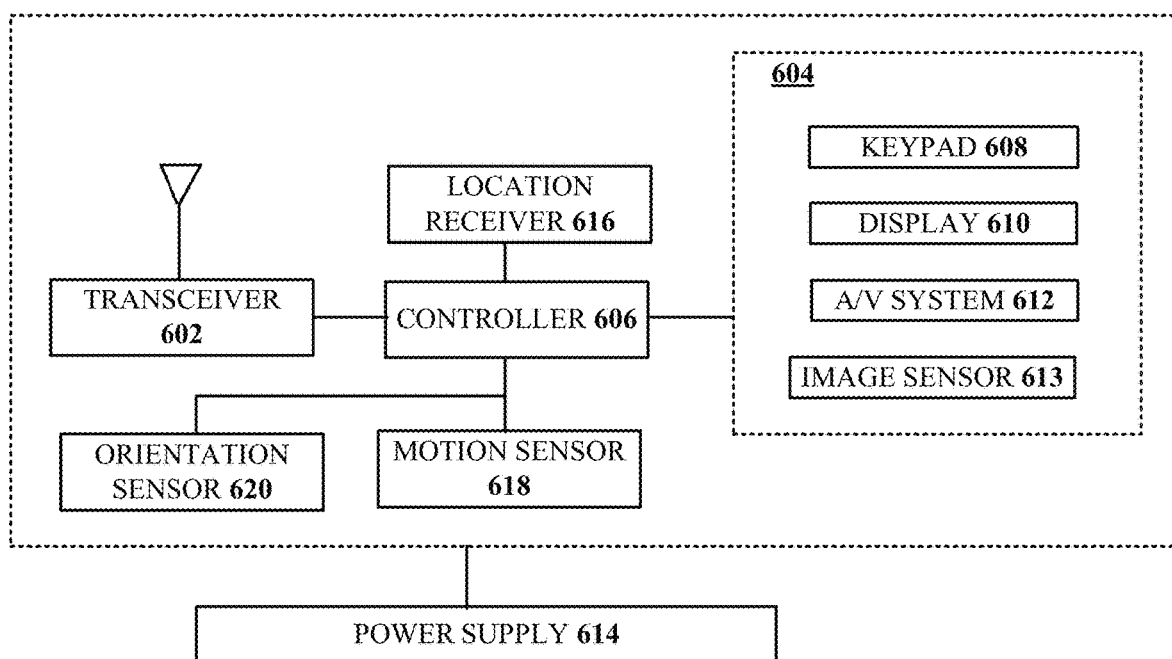
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, dynamic assignment (or allocation) of links for a wireless (e.g., Internet-facing) network device, such as a wireless (e.g., Wi-Fi) router or a WAP, to augment overall network capacity.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
determining that a network condition is satisfied, wherein the device comprises a wireless router or a wireless access point (WAP) associated with a fixed network connection;
based on the determining that the network condition is satisfied, detecting for available networks operating in licensed spectrum and available networks operating in unlicensed spectrum;
responsive to the detecting, identifying a first available network operating in licensed spectrum and a second available network operating in unlicensed spectrum; and
aggregating, in one or more link aggregation groups, a first connection established with the first available network and a second connection established with the second available network, thereby augmenting a network capacity of the fixed network connection.

2. The device of claim 1, wherein the determining that the network condition is satisfied comprises identifying that there is a bandwidth deficit associated with the fixed network connection.

3. The device of claim 1, wherein the first available network comprises a mobile network, and wherein the detecting for available networks operating in licensed spectrum comprises receiving one or more signals from one or more radio access network (RAN) nodes.

4. The device of claim 1, wherein the second available network comprises a wireless local area network (WLAN) or a fixed wireless network, and wherein the detecting for available networks operating in unlicensed spectrum comprises receiving one or more signals from one or more WAPs.

5. The device of claim 1, wherein the fixed network connection comprises an Ethernet connection or a broadband connection, and wherein the determining, the detecting, the identifying, or the aggregating are performed according to a self-discovery mode of operation.

6. The device of claim 1, wherein the one or more link aggregation groups comprise a first link aggregation group that includes the first connection and a second link aggregation group that includes the second connection.

7. The device of claim 1, wherein the determining that the network condition is satisfied involves use of a sampling window.

8. The device of claim 1, wherein the device is associated with a global unique identifier, and wherein a first network system associated with the first available network and a second network system associated with the second available network utilize the global unique identifier to assess charges for usage of the first available network and the second available network.

9. The device of claim 1, wherein the operations further comprise performing a first determination that a first performance associated with the first connection satisfies one or more performance criteria and performing a second determination that a second performance associated with the second connection satisfies the one or more performance criteria, and wherein the aggregating is effected based on the first determination and the second determination.

10. The device of claim 9, wherein the one or more performance criteria relate to network latency, network speed, noise, interference, signal quality, signal strength, transmit power, usage cost, or a combination thereof.

11. The device of claim 1, wherein the operations further comprise, after the aggregating, determining that a second network condition is satisfied and removing the first connection, the second connection, or both from the one or more link aggregation groups based on the determining that the second network condition is satisfied.

12. The device of claim 11, wherein the determining that the second network condition is satisfied comprises identifying a bandwidth surplus in total network capacity of the one or more link aggregation groups.

13. The device of claim 1, wherein the operations further comprise providing a user interface (UI) that enables a user or an administrator to select operational settings relating to dynamic link aggregation.

14. A non-transitory machine-readable medium, comprising executable instructions that, when executed by a processing system of a wireless router or a wireless access point (WAP) including a processor, facilitate performance of operations, the operations comprising:
forming a first link aggregation group that includes a first set of network connections that operate over licensed spectrum;
forming a second link aggregation group that includes a second set of network connections that operate over unlicensed spectrum; and
performing packet scheduling for first traffic associated with the first set of network connections in the first link aggregation group, second traffic associated with the second set of network connections in the second link aggregation group, and third traffic associated with a fixed network connection of the wireless router or the WAP.

15. The non-transitory machine-readable medium of claim 14, wherein the performing the packet scheduling is affected by a mediation layer of the processing system.

16. The non-transitory machine-readable medium of claim 14, wherein the performing the packet scheduling involves use of packet data convergence protocol (PDCP).

17. The non-transitory machine-readable medium of claim 14, wherein the network connections in the first set of network connections are established with a set of radio access network (RAN) access points.

18. The non-transitory machine-readable medium of claim 14, wherein the network connections in the second set of network connections are established with a set of WAPs.

19. A method, comprising:
establishing, by a processing system of a first wireless network device, a network connection with a second wireless network device, wherein the first wireless network device is located within an area that restricts use of a particular portion of licensed spectrum, wherein the second wireless network device is located external to the area, and wherein the second wireless network device is configured to dynamically aggregate a plurality of network connections that are established with one or more mobile networks operating in the particular portion of licensed spectrum; and using, by the processing system, the network connection to facilitate network connectivity for one or more client devices located within the area.

20. The method of claim 19, wherein the network connection is established according to a wireless local area network (WLAN) standard.

* * * * *